Dec. 25, 1956 A. CLARKSON 2,775,555
PRECIPITATING SCALE FORMING CONSTITUENTS FROM WATER BY HEAT
Filed Feb. 25, 1952 3 Sheets-Sheet 2
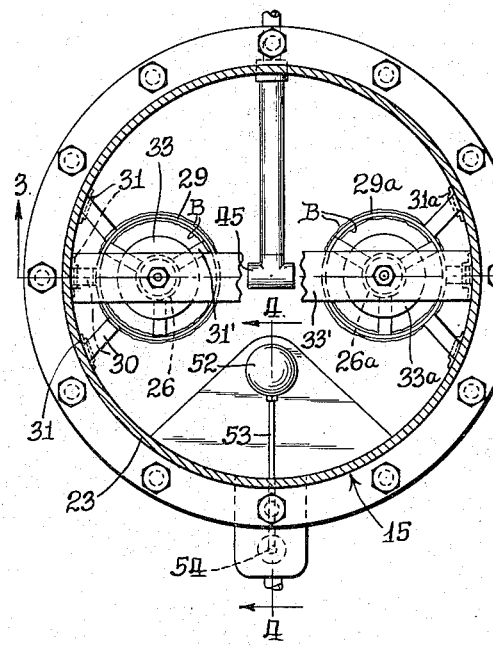
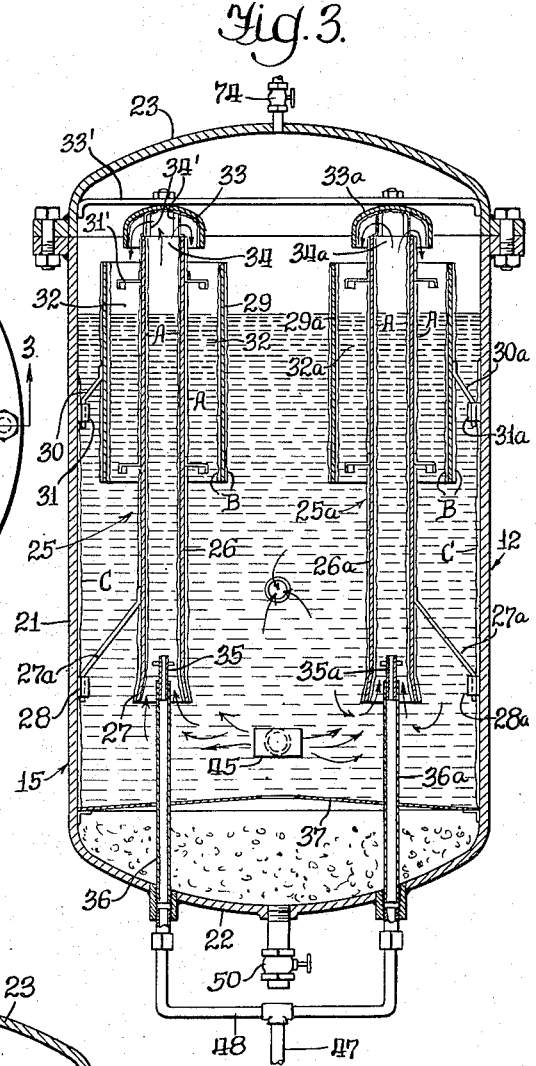
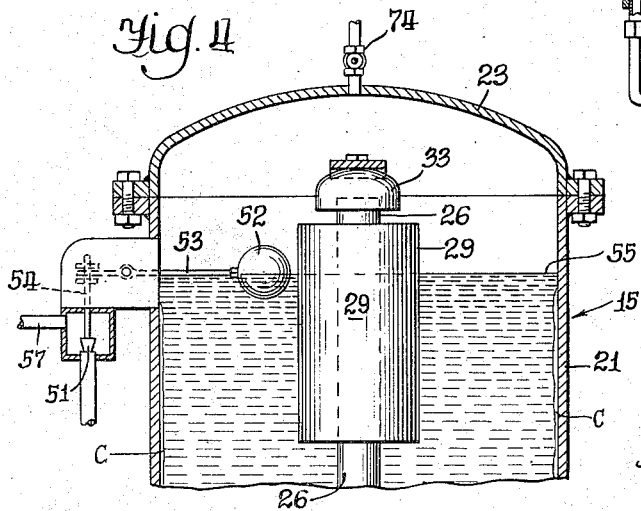
INVENTOR.
Alick Clarkson
BY
Harvey M. Gillespie
Atty.

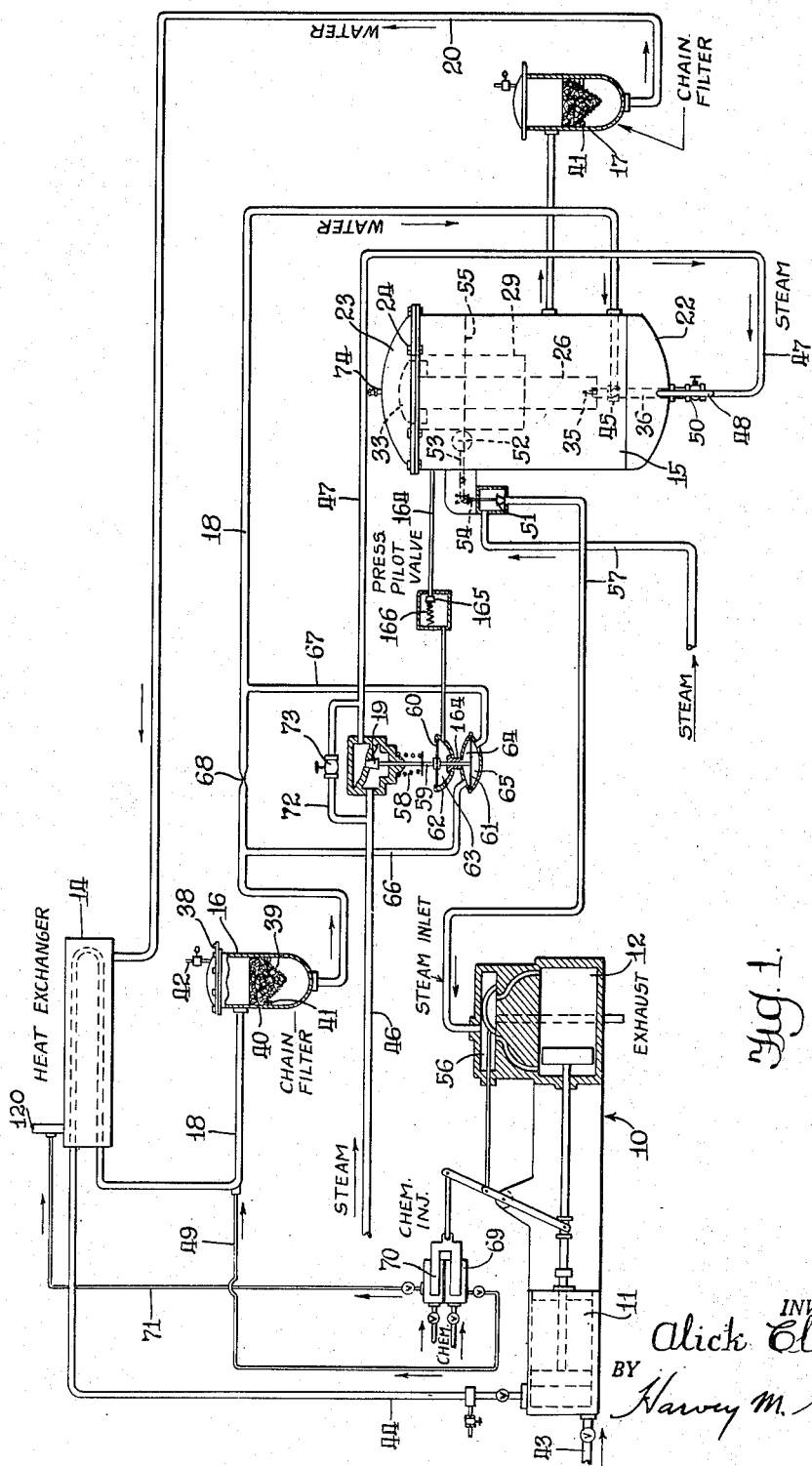

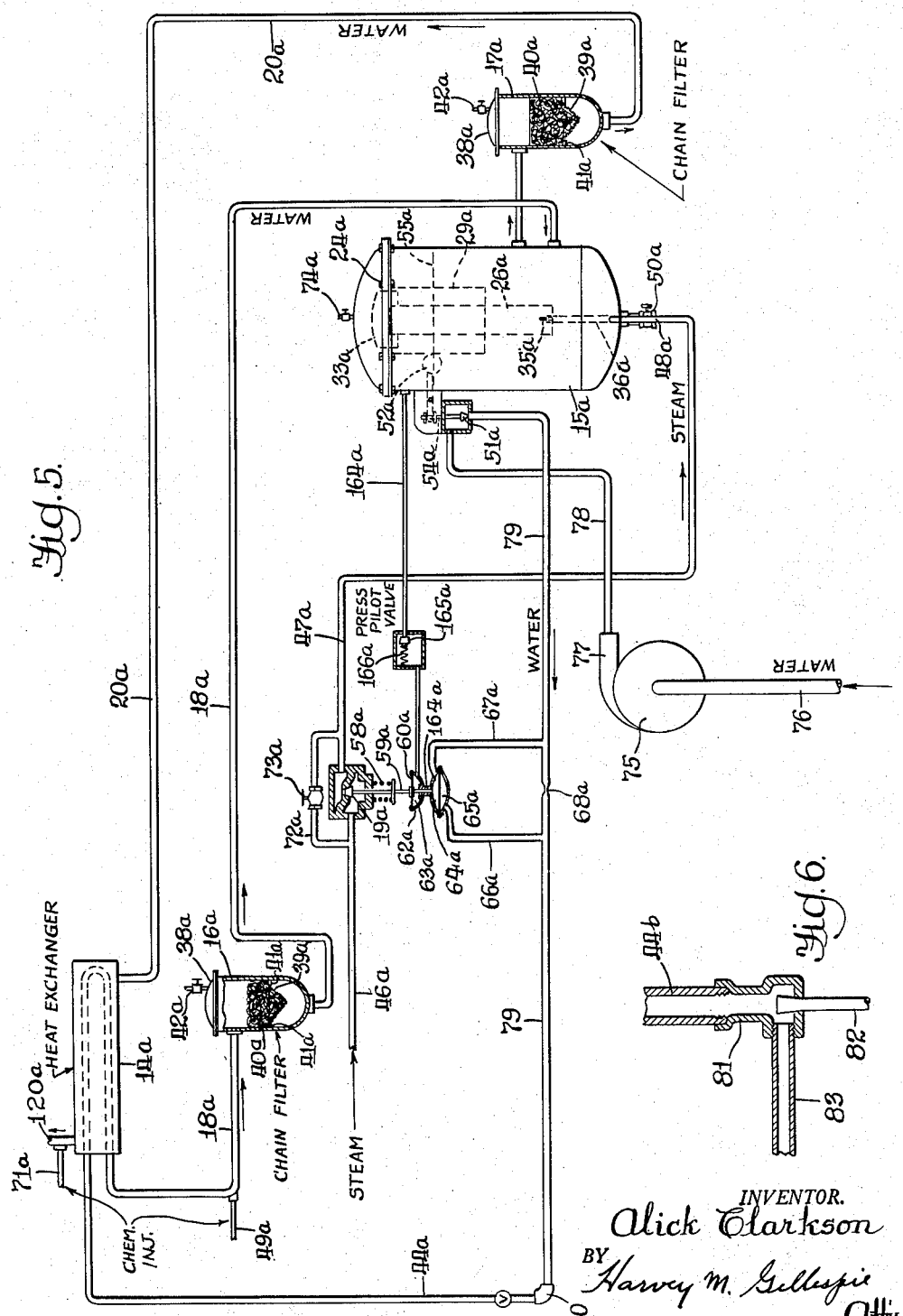

United States Patent Office 2,775,555
Patented Dec. 25, 1956

2,775,555

PRECIPITATING SCALE FORMING CONSTITUENTS FROM WATER BY HEAT

Alick Clarkson, Paul Spur, Ariz., assignor to Vapor Heating Corporation, Chicago, Ill., a corporation of Delaware Application February 25, 1952, Serial No. 273,234

9 Claims. (Cl. 210—15)

This invention has to do with a new process and apparatus for treating water to remove the water hardening and scale forming constituents contained in solution therein.

The process and apparatus herein disclosed were conceived primarily with the view of treating boiler feed water to remove the so-called water hardening and scale forming minerals contained therein. However, it will become immediately apparent that the water so treated may be used in any situation for which it is suitable. It will be understood, therefore, that any reference made herein with respect to a specific use of the treated water is intended merely as an illustration and not as a limitation.

The principal object of the invention is to provide an improved process and apparatus by the use of which water hardening minerals contained in solution in the water may be quickly converted into substances which are insoluble in water and thereafter removed from the water preliminary to its delivery into a boiler for evaporation or other use.

The water which is ordinarily available for use in boilers, steam generators, commercial laundries, and various other situations in which water is heated to high temperatures or evaporated, usually contain, in solution, objectional quantities of water hardening minerals, for example calcium and magnesium bicarbonates, calcium and magnesium chlorides and calcium and magnesium sulphates and in some regions there may be objectionable quantities of iron and other minerals.

Some of the minerals contained in water, particularly calcium and magnesium bicarbonates, can be partially removed by heating the water to relatively high temperatures. Some, but not all of the bicarbonate, will break down at temperatures of 150° to 300° F. and will settle to the bottom of the heating tank or reservoir. However, as a general rule, the majority of water hardening minerals require both chemical treatment and heat to convert such minerals into water insoluble particles capable of being removed from the water. Consequently, the practical methods and apparatus heretofore employed for removing such minerals from the water have entailed the use of large treating and settling tanks or reservoirs and have required long periods of time to complete the chemical reaction, coagulation and precipitation of the minerals. Therefore, the methods and apparatus heretofore known are not suitable for use in situations in which the water softening treatment and the coagulation and the removal of the reacted minerals from the water are carried on as a continuing operation concurrently with the delivery of the treated water to a boiler, steam generator or other apparatus for use.

As a result of the above circumstances, it is now customary to introduce water softening chemicals into the feed water for boilers and steam generators and other apparatus in which the water is used and to permit the chemical reaction to take place while the water is heated or evaporated in the boiler or otherwise used in other apparatus. As a result the coagulated reaction materials which separate from the water deposit on the interior surfaces of such boiler, evaporator, or other apparatus and in the piping associated therewith in the form of scale and sludge, which scale incrustation and sludge must be removed at frequent intervals.

The disclosure of the present invention recognizes the known fact that the dissolved minerals contained in the usual surface and under ground sources of water can be in some instances precipitated by heating the water to high temperature, and thereafter permitting the heat reacted materials to settle out, whereas in other instances it is desirable to introduce suitable chemicals into the heated water to convert the minerals into water insolubles capable of being coagulated and removed from the water. The improvements of the present invention principally in the provision of improved process steps and apparatus for accelerating the heat and chemical reaction on the sludge and scale forming minerals in the water at locations and under operating conditions which accelerates not only the chemical reaction but also accelerates the coagulation and precipitation of the reacted materials.

According to the improved process, the water is heated to a moderate temperature, for example 100° to 150° F., and passed through a filter device to remove such foreign substances which may be in suspension in the water. If the water contains water hardening minerals in solution which require chemical treatment to facilitate their removal, for example calcium and magnesium chlorides and/or sulphates or other minerals requiring chemical teratment for their removal, the appropriate chemical or a mixture of two or more in predetermined proportions for producing the desired reaction is introduced into the heated water before it passes through said filter device. In such case the water treatment chemicals, usually composed of caustic soda, soda ash, and one or more phosphates, reacts with minerals in solution and a portion of these minerals are sufficiently converted and coagulate to form particles in suspension of sufficient size to be removed from the water as it passes through the said filter device.

The water coming from the filter is delivered into a closed treating tank and the temperature of the water, immediately upon its entrance into the tank, is raised abruptly to approximately 250° to 300° F., there being a pressure of approximately 50 pounds per square inch maintained in the treating tank. The water is heated by direct contact with steam while the water is given highly turbulent movements in a predetermined and confined path within an otherwise relatively calm body of water contained in the tank. This path for the turbulent movement is defined by a pair of concentrically arranged ducts positioned in the treating tank, there being a baffle cap at one end of the ducts adapted to reverse the direction of the water discharged from the inner duct so that the water will have an extreme turbulent flow; the turbulence together with the impact against cleanable surfaces within the tank facilitate the removal of dissolved oxygen and other gases from the water and also builds up particles of the reacted material for deposit on said surfaces.

A jet of steam is delivered into the receiving end of the inner duct to heat the water, compelling it to flow through a high temperature and turbulent zone. The high temperature accelerates the chemical reaction in accordance with the known laws of chemistry and the movement of the steam and its condensation within the high temperature and turbulent zone causes the reacted mineral particles to collide with each other and thereby assist in the building of particles of sufficient size to adhere to the said cleanable surfaces within the treating apparatus.

The direct contact of the high temperature steam, approximately 350° to 400° F., with the lower temperature water is utilized to set up a high rate of vibration which functions to dislodge surplus accumulation of scale from the surfaces within the treating apparatus. The dislodged flakes of scale quickly settle to the bottom of the treating apparatus from which they may be flushed out without stopping operations of the water treatment process.

Some water from the main body of water in the tank is entrained with the incoming water and is again passed through the highly turbulent heating zone. The small particles of fully or partially reacted mineral contained in said entrained water act as catalyzers within the high temperature zone and thereby accelerate the said chemical reaction. These small particles also serve as nuclei on which the water hardening minerals crystallize and thereby build larger particles.

Various exemplary embodiments of apparatus are shown in the accompanying drawings for carrying out the process hereinabove set forth.

In the drawings:

Fig. 1 is a schematic showing of a water treating installation;

Fig. 2 is a plan view of a water treating tank with the top cover removed;

Fig. 3 is a vertical section of the water treating tank taken on line 3—3 of Fig. 2;

Fig. 4 is a fragmentary vertical section of the tank shown in Figs. 2 and 3, the view being taken on line 4—4 of Fig. 2;

Fig. 5 illustrates schematically a modification embodying a continuously operated pump as a substitute for the steam pump shown in Fig. 1; and Fig. 6 illustrates another modification embodying a steam jet as a substitute for the pumps shown in Figs. 1 and 5.

The system depicted in Figs. 1–4 inclusive, comprises, among other components, a steam-driven reciprocating engine 10, including a pump cylinder 11 and a steam cylinder 12; a heat exchanger 14, of any suitable construction; a water treatment tank designated generally by the reference numeral 15; two filters designated 16 and 17, the former of which is connected in water supply line 18 leading from the heat exchanger 14 to the inlet port of the treating tank 15. The other filter 17 is connected in the water discharge pipe 20 leading from the treating tank 15 to the heat exchanger 14 and thence by the piping 120 to a boiler, steam generator, or other apparatus (not shown) in which the treated water is to be used. The water treating tank 15 includes a cylindrical shell 21 arranged preferably in a vertical position and provided with lower and uppr closure heads 22 and 23, respectively. The upper closure head 23 is preferably removably secured in its operative position by means of a series of clamp bolts 24 whereby the closure head can be readily removed when desired to inspect the interior of the tank 15 or to remove other elements enclosed in the tank.

Located within the tank is one or more water heating units. In the present embodiment 2 such units, designated as a whole by the reference characters 25—25ª, are removably secured to the inner walls of the tank 15.

The water heating unit 25 comprises a vertically arranged conduit 26 formed with a bell-shaped lower end 27 and leads from the lower portion of the tank to a location near the upper end thereof. The conduit 26 is preferably removably secured to the inner wall of the shell 21 by means of a supporting arm 27ª welded or otherwise secured to the conduit with the lower end of the arm fitting in a supporting socket 28. A somewhat larger conduit element 29 surrounds the upper end of the conduit 26 and is likewise secured to the inner wall of the shell 21 by means of arms 30 removably fixed in socket elements 31 secured to the shell of the tank. The conduit members 26 and 29 are supported in concentric relation by means of spacer elements 31' and cooperate to define an annular passage 32. A baffle cap in the form of an inverted dished-shaped element 33 and having a diameter larger than the inner conduit 26, but smaller than the outer condut 29, is supported above the outlet end 34 of the conduit 26 by means of spacers 34' and is removably secured to portions of the tank by means of a suitable tie-down strap 33'.

Steam for heating the water is delivered into the receiving end of the conduit 26 from a nozzle 35 connected to a steam pipe 36 which enters the tank 15 through the lower head 22. The lower portion of the tank 15 is provided with a foraminous partition 37.

The water heating elements 25 and 25ª are preferably identical in construction. The several elements of the unit 25ª, therefore, are identified by the same reference characters with the exponent "a." The two filters 16 and 17 are of identical construction but are connected in the flow path of the water o that the filter 16 serves to remove particles suspended in the water before the water enters the treating tank 15 and the filter 17 serves to remove any large particle of material which may be discharged from the tank 15. The filter 16 includes the casing, a removable cover 38, and a removable cone-shaped inner vessel 39 made of foraminous material and a mass of chain 40 supported in the cone-shaped element 39. The use of chain as filter elements simplifies the removal and cleaning of the filter elements. The chain elements in this respect are superior to the use of gravel filters and also insures against the possibility of broken pieces or particles of the filter bed being carried into the pumps and valves of the system. The cone-shaped element 39 for supporting the chain is also preferably removable, being loosely supported on internal lugs 41 formed on the inner surface of the filter casing. A valved vent duct 42 leads through the cover 38 so as to vent any accumulation of air from the upper portion of the filter chamber.

The filters 16 and 17 are of identical construction. Therefore, in order to avoid duplication of description, the corresponding parts of filter 17 are identified with reference numerals of filter 16 with the addition of an exponent "a."

The water to be treated is supplied from any available source to the pump cylinder 11 by means of pipe 43 and is driven by the pump through pipe 44, heat exchanger 14, filter element 16 and pipe 18, into the treating tank 15, the water being delivered into the tank through a T-fitting 45 located midway between the vertical centers of the conduits 26—26ª at a location below the inlet ends thereof so that the water discharged from the T-fitting 45 is directed toward the inlet ends of both conduits 26—26ª as indicated by the arrows in Fig. 3 of the drawings. The heat exchanger raises the temperature of the water to approximately 100°–150° F. These temperatures are not critical but are maintained for the purpose of economizing in the use of steam required to raise the temperature of the water to heat the water to the optimum temperature in the treating tank.

Hot steam from any convenient source (not shown) is conducted through a pipe 46 through an automatically controlled admission valve 19 and pipe section 47 to a manifold 48 and thence into the steam pipes 36—36ª from which it is discharged through nozzles 35—35ª into the conduits 26—26ª. The steam discharged from the nozzles 35—35ª into the conduits 26—26ª causes the water discharged from the T-fitting 45 to follow the path indicated in arrows and enter the lower end of the conduits 26—26ª. The water within the conduits 26—26ª is heated by the steam and is impelled upwardly at high velocity through the conduits 26—26ª and against the inner surfaces of the deflector hoods 33—33ª, the latter element serving to reverse the flow path of the water so that it is then directed downwardly through the passages 32—32ª defined by the upper end of conduits 26—26ª and the surrounding conduits 29—29ª. This downwardly moving water will follow its downward movement toward the bottom of the tank 15, whereby a portion of said downwardly moving water is drawn into the lower end of the conduits 26—26ª and recirculated through the heating zones defined by the conduits 26—26ª. The temperature of the water is raised to approximately 250° to 300° F. as it is passed through the heating zones. The steam also sets up a high turbulence within the heating zone which turbulence is continued through a portion at least of the downwardly directed flow path of the water through conduit 29. The turbulence causes the small particles of water hardening minerals which have been broken down by the temperature and/or water treatment chemicals introduced into the water, as hereinafter described, to collide with each other and thereby build up particles of sufficient size which will settle to the bottom of the tank or which will adhere to the surfaces of the conduits 26—26ª, 29—29ª, and the inner wall of the shell 21. As previously indicated, certain of the water hardening minerals can be broken down, to a large extent, by heat alone, whereas other minerals require the addition of chemicals to produce the necessary reaction to cause them to break down and separate in the form of coagulated and crystallized particles. When water treatment chemicals are used they are introduced from pipe 49 into the water supply pipe in advance of the filter 16. Any coagulation of minerals which may result from the reaction in the water conduit is removed by the filter 16, but the major portion of the minerals are removed as a result of the high temperature treatment and turbulence to which it is subjected in the heating zones defined by the conduits 26—26ª since the higher temperatures, turbulence and vibration present in the heating zone accelerates the reaction and breaking down of the minerals to form water insoluble particles.

In addition to the coagulation of the reacted particles of mineral as a result of the turbulence within the heating zone whereby the particles are built up to sizes sufficient to adhere to the surfaces of the conduits and the walls of the treating chamber, the condensation of the steam and the turbulence resulting therefrom creates a high rate of vibration and these vibrations serve to dislodge or flake off the excessive deposits of reacted minerals from the surfaces of the conduits 26—26ª, 29—29ª, and the inner surface of the shell 21. As a consequence, the coagulated mineral particles which settle to the bottom of the tank, together with the crystallized scale which is dislodged from the scale collecting surfaces, and settle to the bottom of the tank, may be flushed from the tank through a blow-down valve 50 without interrupting the operation of the water treating system.

In situations in which the mineral incrustations are of such composition that they are not readily dislodged by the vibrations set up in the heating zone, the closure head 23 may be readily removed so that the conduits 26, 29 and baffles 33, 33ª can be readily removed and clean elements replaced therefor.

The delivery of water into the heating tank 15, the delivery of steam thereto and the delivery of water treatment chemical into the water are all proportionately controlled in relation to the water level in the tank and the pressure variations above the water level. The delivery of water into the tank is controlled directly by automatically controlling the operation of the pump 10. This is accomplished by means of a steam control valve 51 which is operated by a float 52. The float is mounted on a pivoted lever 53, the outer end of which loosely engages the upper end of the stem 54 of valve 51. When the water in the tank is at its maximum level 55 the float 52 is raised to a position to close the valve 51 and therefore shut off the delivery of steam to the engine 10. However, when the water falls below its normal level the float 52 will be lowered so as to unseat the valve 51 and thereby deliver steam into the steam chest 56 of the engine 10 and thereby set the water pump into operation. The amount of steam delivered to the engine 10 will obviously vary in relation to the rise and fall of the water level in the tank 15.

The delivery of steam into the tank 15 for heating the water is controlled automatically by the flow of water to the treating tank 15 in combination with the pressure above the water level in the tank. This control is effected by means of a normally open valve 19 interposed between the sections 46—47 of the steam pipe for delivering steam into the tank 15. The valve 19 is biased to its open position by means of a spring 58 and the stem 59 is connected to two diaphragms 60 and 61. The diaphragm 60 and its casing 62 defines a pressure chamber 63 which is connected by means of conduit 164 to a pressure pilot 165. The valve 165 is biased to a closed position by a spring 166 and is adapted to open upon the rise in pressure above the optimum pressure of 50 pounds desired in the treating chamber 50. Consequently, when the pressure in the tank 15 rises above 50 pounds pressure is delivered into the diaphragm chamber 63 below the diaphragm 60 and thereby tends to move the valve 18 in a direction to restrict the delivery of steam to the tank 15. Also, the chambers 64 and 65 disposed at opposite sides of the diaphragm 61 are connected by conduits 66 and 67 into the water delivery pipe 18 at opposite sides of an orifice restriction 68 interposed in the said pipe 18. It will be seen, therefore, that the chamber 64 disposed above the diaphragm 61 is a high pressure chamber and the chamber 65 located below the said diaphragm 61 is a low pressure chamber. Consequently, the pressure differential in the chambers 64 and 65 will vary in relation to the pressures in the conduit 18 at opposite sides of the restriction 68. It will, therefore, be seen that the position of valve 19 at any selected period is controlled by the combined effects of the flow of water to the treating tank 15 and the pressure above the water level in the tank.

The delivery of a suitable water treatment chemical into the water delivery line 18 in predetermined proportion to the volume of water and also the delivery of a sludge conditioning chemical into the water feed pipe 120 is proportionately controlled by means of injector pumps 69 and 70 which are operated by the steam engine 10, the pump 69 being connected by means of pipe 49 into the water pipe 18 and the pump 70 being connected into the feed water pipe 120 leading to the boiler or other apparatus (not shown) by means of a conduit 71. It is desirable to introduce a sludge conditioner into the said water feed pipe 120 when the water is delivered to a boiler or steam generator so that in the event any fine particles of reacted material is suspension passing through the filter 17 and entering the boiler will not solidify in the form of scale in the boiler.

In order to insure delivery of steam into the tank in quantities sufficient to maintain an optimum temperature during periods when the valve 19 is closed, a by-pass conduit 72 is connected into the steam line 47 at opposite sides of the control valve 19. A hand-operated valve 73 is interposed in the by-pass conduit 72 so as to control the amount of steam delivered when the valve 19 is closed.

Referring again to the turblence and vibrations which are set up in the heating zone within the tank 15: These factors together with the high temperatures maintained tend to remove the atmosphere and such other gases including oxygen liberated from the water and thereby avoid the formation of corrosion in the interior of the boiler or other apparatus in which the treated water is used. These gases are vented from the tank 15 through a bleed valve 74.

The modification shown in Fig. 5 involves the same liquid treating process as shown in Fig. 1, but the manner in which the water is forced into the tank is somewhat different. Here a water pump 75 is of the centrifugal type and may operate continuously even though the flow of water into the system is completely shut off. The pump 75 may be driven by any suitable means such as an electric motor or steam engine or other prime mover (not shown). Water is admitted to the pump 75 through an intake pipe 76; the outlet 77 of the pump 75 connects into pipe 78 which connects directly into pipe 44ª by elbow 80. The pipe 44ª corresponds to pipe 44 of Fig. 1 and delivers water into the heat exchanger 14. The means for controlling the delivery of steam to the tank 15, is the modification shown in Fig. 5, is identical with the means shown in Fig. 1 except that the pressure branch ducts 66ª and 67ª are connected into the water pipe 79 at opposite sides of an orifice restriction 68ª. The other elements of the modification which are the same as corresponding elements shown in Fig. 1, are identified by the same reference characters with the exponent "a." It will be seen, therefore, that when the flow of water to the tank 15 in the modification shown in Fig. 5 increases or decreases, a corresponding increase or decrease in the supply of steam is effected in relation to the volume of water and the pressure in the tank. When water treatment chemicals are introduced into the system shown in Fig. 5 the chemicals are introduced in proper proportion into the water by means of pumps (not shown) which may be suitably geared in well known mechanical manner to the device for operating the centrifugal pump 75.

In the modification shown in Fig. 6, a steam injector pump designated generally by the reference character 81, is interposed in a water supply pipe 44ᵇ which corresponds to pipe 44 of Fig. 1. In this connection, steam delivered through a jet 82 draws water from a source of supply through pipe 83 and delivers it into the said water pipe 44ᵇ from which it is then carried through the system in the same manner as previously described in connection with Fig. 1. It is contemplated in this connection that the steam delivered to the steam engine 10 of Fig. 1 shall be delivered to the steam jet 82 of the modification as shown in Fig. 6. In this manner, the supply of water delivered into the tank 15 will be controlled by the float operated valve 51.

As will be evident, there are many possible modifications and variations within the scope of my generic invention concept and accordingly I do not wish to be limited otherwise than as clearly indicated by the terms of the appended claims.

What I claim is:

1. In a system for treating water for removal of scale forming constituent, the combination of a separating tank having a top opening with a removable cover, a vertical conduit defining a heating zone disposed within said tank and accessible for removal through said top opening upon removal of the cover, a water delivery pipe opening within the tank at a point near the bottom of said vertical conduit, a nozzle for delivering steam into the water receiving end of said conduit to heat the water therein, means including a valve for controlling the flow delivery of water to said conduit, a float mechanism responsive to the liquid level in the tank for controlling said valve whereby to maintain a predetermined liquid level in the tank, a steam-supply pipe connected with said nozzle, an automatic shut-off valve included in said steam pipe, and pressure responsive means for controlling the position of said steam shut-off valve including a means responsive to the pressure within said separating tank above the water level therein whereby to regulate the steam supply to the heating zone so as to maintain the temperature of the water in the tank within a prescribed range.

2. The combination defined in claim 1 characterized in that the said automatic shut-off valve is closed by the pressure differential at opposite sides of a constriction in the water pipe for delivering water to said tank, whereby the delivery of steam to the said nozzle is controlled in relation to the volume of water delivered.

3. The process of treating water for removal of water hardening substances contained in solution therein, which comprises the step of heating the water under a substantial pressure and in a restricted zone of a larger and quiescent body of water to a temperature near the boiling point to effect rapid decomposing reaction on the water hardening substances, discharging the water from said heating zone into the upper portion of a second restricted zone within said larger body of water, introducing a catalyzer into the heating zone which consists in recirculating through the heating zone, with the water to be treated, previously treated water containing in suspension particles of reacted material, and simultaneously maintaining high turbulence in the water being heated to bring minute suspended particles of reacted material into forceable contact with each other so as to build larger and heavier particles which will more readily precipitate.

4. The process of treating water for removal of water hardening substances contained in solution therein which comprises the step of heating the water in a closed vessel under a substantial pressure and in a restricted zone of a larger and quiescent body of water in said vessel by introducing a jet of steam into direct contact with the water within said restricted heating zone to heat the water to near the boiling point so as to effect accelerated decomposition reaction on the water hardening substances and thereby convert them into insoluble reacted particles; to create high turbulence in the water within the restricted heating zone so as to accelerate coagulation of the particles of reacted material into larger particles so as to expedite precipitation thereof and also induce adhesion thereof in the form of scale on collecting surfaces within said vessel, and to create, as an incident to the turbulence and the condensing of steam in the water, a high rate of vibrations adapted to dislodge excessive deposits of scale on surfaces within said vessel.

5. The process as set forth in claim 4 including an additional step in which the steam is also utilized to impel the water against a baffle element as it is discharged from said restricted heating zone to remove liberated gases from the water and to reverse the flow path of the water.

6. An apparatus for treating water for removal of water hardening substances contained in solution therein comprising a tank for containing a body of water, means defining a confined water heating zone within the tank including a vertically extending conduit positioned in said body of water and having an open inlet below the water level and near the bottom of the tank and an open discharge end above the water level in the tank, means for delivering a jet of steam into the inlet end of said conduit to heat the water, produce high turbulence therein and for impelling the water upwardly from said discharge end thereof, whereby the water hardening substances contained in solution are decomposed by the heat into insoluble particles in suspension and the high turbulence accelerates coagulation of the minute insoluble particles into particles of larger size to facilitate removal thereof from the water, and a baffle element supported in upwardly spaced relation to the discharge end of said conduit and forming a target against which all of the water discharged from said conduit is impelled to liberate gases therefrom, the said baffle being of inverted cup shape for directing the discharged water in a downward path toward the inlet end of said conduit.

7. An apparatus for treating water for removal of water hardening substances contained in solution therein comprising a tank for containing a body of water, means defining a confined water heating zone within the tank including a vertically extending conduit positioned in said body of water and having open inlet below the water level and near the bottom of the tank and an open discharge end above the water level in the tank, means for delivering a jet of steam into the inlet end of said conduit to heat the water and to produce high turbulence therein including impelling the water through said discharge end thereof, whereby the water hardening substances contained in solution are decomposed by the heat into insoluble particles in suspension and the high turbulence accelerates coagulation of the minute insoluble particles into particles of larger size to facilitate removal thereof from the water, a baffle element supported in upwardly spaced relation to the discharge end of said conduit and forming a target against which all of the water discharged from said conduit is impelled to liberate gases therefrom, the said baffle being of inverted cup shape for directing the discharged water in a downward path toward the inlet end of said conduit, and a large conduit surrounding the discharge end of the first mentioned conduit and cooperating with said first conduit to provide a passage defining a confined return path of said discharged water and providing surfaces for receiving deposits of the coagulated water hardening substances.

8. An apparatus for treating water for removing water hardening constituents therefrom as defined in claim 1 characterized in that a second heating zone corresponding in structure to the first mentioned zone is located in parallel to the first mentioned zone, and means are provided including a water delivering pipe leading into the tank at a location midway between the inlet end of both heating zones and provided with means for directing water delivered into the tank through the body of water toward the inlet ends of both said zones.

9. In a system for treating water for removal of scale forming constituents, the combination of a separating tank, a vertical conduit defining a heating zone disposed within said tank, a water discharge pipe connected to said tank and opening within the tank at a point well above the bottom, a nozzle for delivering steam into the lower end of said vertical conduit to heat water therein and to produce high turbulence and vibrations therein, a water supply pipe leading into said tank, a heat exchanger interposed in said water supply line, a filter device interposed in the water supply pipe intermediate the heat exchanger and the separating tank, a hot water line for conducting hot treated water to said heat exchanger to preheat said water delivered to said tank, a filter device interposed in said discharge pipe, a steam-supply line connected to said nozzle and including a valve, and means including a float-controlled mechanism responsive to the water level in said tank for controlling said valve and to regulate the supply of steam to the said nozzle in accordance with the volume of the flow of water to the tank and the temperature and pressure therein.

References Cited in the file of this patent

UNITED STATES PATENTS

| Number | Name | Date |
|---|---|---|
| 469,770 | Bunnell | Mar. 1, 1892 |
| 708,058 | Martinson | Sept. 2, 1902 |
| 868,776 | Gregory et al. | Oct. 22, 1907 |
| 925,283 | Brazda | June 15, 1909 |
| 1,000,689 | Paterson | Aug. 15, 1911 |
| 1,039,586 | Patten | Sept. 24, 1912 |
| 1,083,740 | Hodges | Jan. 6, 1914 |
| 2,054,798 | Gibson | Sept. 22, 1936 |
| 2,223,634 | Morton | Dec. 3, 1940 |
| 2,300,430 | Morrell et al. | Nov. 3, 1942 |
| 2,365,293 | Robinson | Dec. 19, 1944 |
| 2,404,701 | Felsecker | July 23, 1946 |
| 2,509,683 | Green | May 30, 1950 |
| 2,591,134 | Canariis | Apr. 1, 1952 |

FOREIGN PATENTS

| Number | Country | Date |
|---|---|---|
| 591,310 | France | July 2, 1925 |
| 607,012 | Great Britain | Aug. 24, 1948 |
| 634,993 | Great Britain | Mar. 29, 1950 |